Jan. 27, 1942.  E. W. McKINNEY  2,271,145
FLUID OPERATED DEVICE
Filed Jan. 29, 1940

INVENTOR.
ELSMERE W. McKINNEY
BY
Hoodling and Krost attys.

Patented Jan. 27, 1942

2,271,145

UNITED STATES PATENT OFFICE 2,271,145

FLUID OPERATED DEVICE

Elsmere W. McKinney, Cleveland, Ohio, assignor to The McKinney Tool and Manufacturing Company Application January 29, 1940, Serial No. 316,177

22 Claims. (Cl. 29—69)

My invention relates to fluid operated device for accelerating or moving a mass in substantial accordance with another mass.

An object of my invention is to provide a device to accelerate a first mass from a first velocity to a velocity governed by the velocity of a second mass.

Another object of my invention is to provide a device to accelerate a mass from a velocity of zero to a velocity governed by the velocity of a second mass and to cause the velocity of the first mass to substantially equal the velocity of the second mass.

Still another object of my invention is to provide an acceleration device which will cause a stationary mass to accelerate to a speed governed by the speed of a moving mass and cause the accelerated mass to follow the speed variations in said moving mass.

A further object of my invention is to provide a device for paralleling velocity.

Another object of my invention is to provide a device which will cause a relatively large mass to accelerate to a fixed velocity in a relatively short distance and to relieve the device of substantially all of the strain due to the force necessary to produce the acceleration.

Still another object of my invention is to provide a device which will actuate a first mass to a speed governed by the speed of a second mass and which will cause the first mass to follow any variations in speed which may be evidenced by the second mass.

Another object of my invention is to provide a device which will accelerate a first mass from zero velocity to the velocity of a second mass and which will regulate the firt mass to parallel the velocity of the second mass after the acceleration period is over and which will cause the first mass to accelerate from the regulated velocity back to zero velocity after the first mass has passed through a certain distance.

A further object of my invention is to provide a system for cutting off moving bar-stock in which the bar-stock is moving at a variable speed.

Still another object of my invention is to provide a machine for cutting off moving bar-stock which will accelerate the cutting device from zero velocity to the velocity of the moving bar stock and which will cause the cutting device velocity to substantially equal the velocity of the moving bar-stock while the cutting device is cutting through the bar-stock and which will negatively accelerate the cutting device from the velocity of the moving bar-stock to zero after the bar-stock is cut off.

A further object of my invention is to provide an acceleration device which will rapidly accelerate a relatively large mass with a minimum of shock.

Another object of my invention is to provide a device having an urging force associated therewith which is held in balance by a fluid force and to overthrow the established balance in response to the difference between two velocities and thereby cause one of the velocities to be affected (by the unbalanced urging force).

Still another object of my invention is to furnish a velocity changing device which responds to two velocities and which changes one of the velocities to which it responds.

Another object of my invention is to provide a system for cutting off moving bar-stock in which the bar-stock is continuously driven at a substantially constant speed and in which the cut-off machine operates in a cycle; one round of the cycle being to accelerate the cut-off mechanism from zero velocity to the velocity of the moving bar-stock, to cut through the bar-stock while the bar-stock and the cut-off machine are traveling at substantially equal velocities; to accelerate the cut-off machine back to its initial zero velocity and to reset the acceleration device to prepare it for another cycle.

A further object of my invention is to provide a device for rapid acceleration of a relatively large mass and to reduce the shock or jar occasioned by the rapid acceleration.

Figure 2 is adapted to be placed at the right end of Figure 1 to form an integral device.

Figure 2:
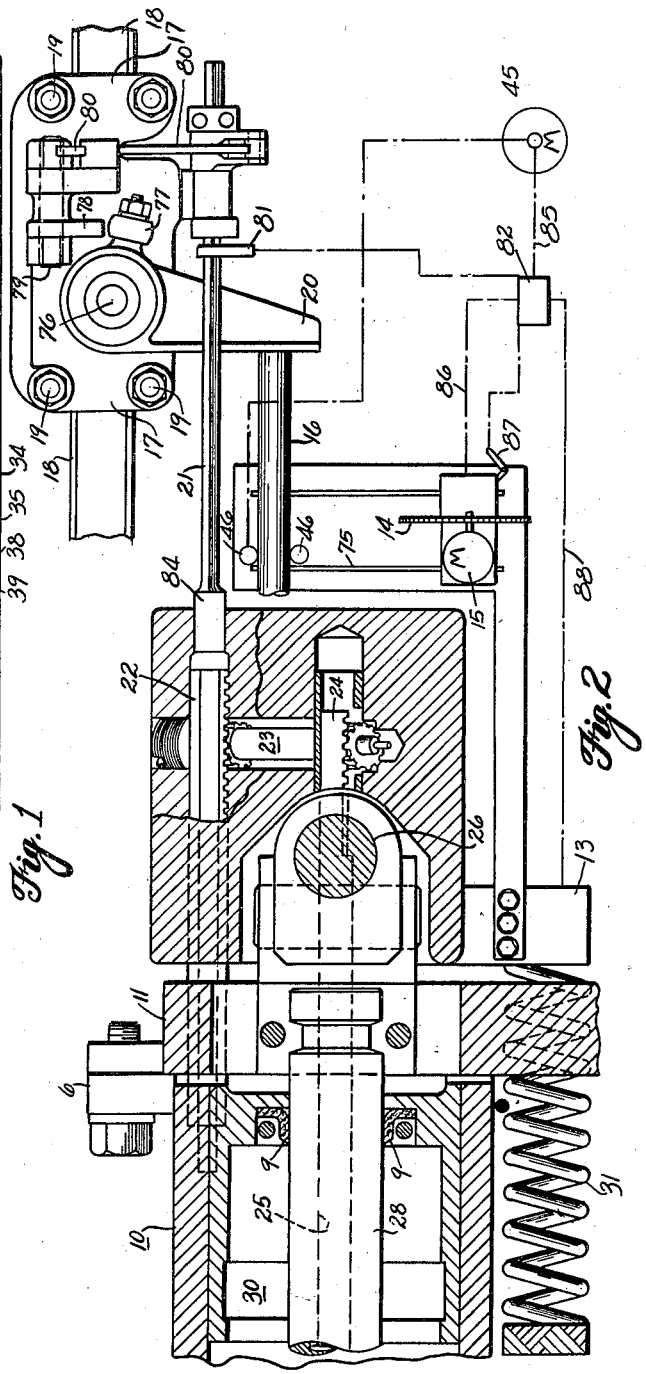
Figure 2 is a sectional view of another part of my invention with portions broken away and including a diagrammatic sketch showing one manner in which my invention can be used.

With reference to the drawing my invention comprises a device to regulate the acceleration and the velocity of a body or mass by the velocity of another body or mass. Figure 2 shows my invention as applied to an automatic machine for cutting off moving bar-stock. It is to be understood however, that my invention may be applied to many other acceleration problems and that I am not to be limited to cut-off machines as the illustration of the cut-off machine is merely to aid in the description.

My invention comprises a stationary actuating housing indicated generally by the reference character 10. The actuating housing is preferably cylindrical and is attached to a stationary hollow collar 11 by means of an attaching flange 6. At the end of the housing 10 and adjacent the hollow collar 11 I provide a fluid seal 9 which provides an opening into the stationary housing 10 for a movable piston connecting rod 28 and for retaining a fluid with which the housing is substantally filled. At the other end of the housing 10 I provide a fluid seal 8 and a closing plate 7 for retaining the fluid with which the housing is substantially filled. The piston connecting rod 28 is adapted to move freely within the hollow portion of the collar 11 and is attached through a universal joint 26 to a mass attaching plate 13 which is in turn attached to a mass which is to be accelerated by my invention. For purposes of description I show a saw 14 and a saw actuating motor 15 which also constitute a mass attached to the mass attaching plate 13 and adapted to be accelerated by my invention.

A length of bar stock 16 is moving continuously and my invention is designed to accelerate the saw 14 and the saw actuating motor 15 from zero velocity to a velocity substantially equal to the velocity of the moving bar stock 16. Upon the velocity of the saw 14 and the saw actuating motor 15 substantially equalling the velocity of the moving bar stock 16 my device is designed to cause the accelerated mass 14 and 15 to stop accelerating and to parallel the velocity of the moving bar stock 16 while the saw 14 cuts through the bar stock 16. After the bar stock 16 has been severed my device is designed to accelerate negatively the moving mass 14 and 15 back to zero velocity without a jarring shock.

Throughout this description I shall use the word "acceleration" to include both positive and negative change in velocity. That is to say I shall use the technical meaning of the word acceleration which includes the popular meanings of the words "acceleration" and "deceleration." Where it is necessary to differentiate between the popular conception of "acceleration" and "deceleration" I shall use positive acceleration to mean an increase in velocity and negative acceleration to mean a decrease in velocity.

To effect the acceleration and the velocity regulation my invention comprises a flag carriage 17 which is easily movable along a track 18. Bearings 19 are provided to assure that the flag carriage 17 slides along the track 18 with a minimum of frictional resistance. A flag 20 is turnably attached to the flag carriage 17 and adapted to be engaged by the moving bar stock 16. The engagement of the flag 20 by the moving bar-stock causes the flag carriage 17 to slide along the flag carriage track 18 at the same velocity as the bar-stock 16 is moving and exercise a pulling force on a length of drill rod 21 having square section. The drill rod 21 which may be of adjustable length to allow for different size pieces of bar-stock is attached to the flag carriage 17 in a manner which permits free rotation with respect to the flag carriage 17 but prevents horizontal sliding with respect to it.

The pulling movement which is exercised on the drill rod 21 is translated into rotational motion by means of a geared rack 22 meshing with one end of a pinion 23. The rotational movement of the pinion 23 is retranslated into a longitudinal pull by means of the other end of the pinion 23 meshing with a geared rack 24 which is integral with a valve control rod 25. By means of the geared connections between the valve control rod 25 and the flag carriage 17 it is to be seen that a movement of the flag carriage 17 under the influence of the moving bar-stock is translated in a fixed proportion to cause a movement of the valve control rod 25.

The valve control rod 25 passes through a universal joint 26 which allows for slight misalignments in various connected parts of my device and through the hollow collar connection 11 and into the hollow piston connecting rod 28 in the stationary actuating housing 10. The universal joint 26 attaches the movable piston connecting rod 28 to the mass 14 and 15 which is to be accelerated. A spring 31 is positioned to bias the mass 14 and 15 and is adapted to exert the accelerating force against the mass 14 and 15 and moves same when the fluid in the actuating device permits it. It is to be understood that any force producing means may be used in the place of the spring 31.

The stationary actuating housing 10 into which the movable valve control rod 25 passes and from which the piston connecting rod 28 is controlled to permit actuation of the mass 14 and 15 by the spring 31 is comprised of a stationary cylinder 32 and a movable piston 33. The movable piston 33 divides the actuating housing 10 into two compartments 29 and 30 and provides a fluid seal between them. The piston 33 is connected to the piston connecting rod 28 and has a skirt 34 with ports 35 through it. There is also a port 36 through the piston head. The ports 35 and 36 permit the passage of fluid through the movable piston 33. The fluid which the actuating housing 10 contains is preferably oil, however, any suitable fluid may be used.

Inside the movable piston 33 there is a piston sleeve 37 which is movable with respect to the movable piston 33. The piston sleeve 37 is placed closely adjacent the piston skirt 34 and contains ports 38 which are adapted to register with the ports 35 in the piston skirt. Ports 41 are also provided to permit passage of the fluid through the piston sleeve head. As the piston sleeve 37 is movable with respect to the piston 33 I have provided a widened circumferential groove 39 which assures that the fluid will be able to pass from one compartment to the other when the piston sleeve 37 is at the extreme ends of its travel with respect to the piston 33.

Connected to the valve control rod 25 which extends to the geared rack 24 and which is movable in response to the movement of the flag carriage 17 is a valve ring 40 which is slidable to regulate the size of the opening of the ports 38. The valve ring 40 is connected to the valve control rod 25 by means of a taper pin 47 and adapted to move with respect to the piston sleeve 37 to regulate the flow of the fluid from one compartment to the other through the piston sleeve ports 38. The regulatory movement of the ring 40 is derived from the movement of the barstock 16 by way of the flag carriage 17, the drill rod 21, the rack and pinion connections and the valve control rod 25.

Assuming that the saw 14 and the saw actuating motor 15 are standing at zero velocity and a motor 45 is driving the bar stock 16 toward the right by means of rollers 46 the action which takes place in my device is as follows: The bar-stock 16 engages the flag 20 and pushes the flag-carriage 17 along the track 18 at the same velocity that the bar-stock 16 is being driven.

The sudden movement of the flag carriage 17 causes a longitudnal movement of the length of drill rod 21 and the movement is transferred to the valve control rod 25 by means of the rack 22, the pinion 23 and the rack 24. Movement of the valve control rod 25 causes the port regulating ring 40 to move to the right and open the port 38. Due to fluid pressure in compartment 30 the fluid flows through the opened port 38 into the compartment 29 which is at a lesser pressure. The pressure which causes the flow of the fluid is derived from the force of the spring 31 biasing the mass attaching plate 13 to the right. As the mass attaching plate is attached to the piston 33 by means of the hollow piston connecting rod 28 the force of the spring 31 is opposed or "taken up" or balanced by the fluid pressure in the compartment 30 pushing against the piston 33. The stronger the spring 31 the greater the fluid pressure in compartment 30 as the fluid pressure is caused by the force of the spring 31. As the fluid flows through the open port 38 the pressure in the compartment 30 is reduced and the force of the spring 31 being no longer balanced by the substantially equal and opposite force of the fluid in the compartment 30 accelerates in a positive manner the saw 14 and the saw actuating motor 15 to the right. As the accelerated mass 14 and 15 is attached to the plate 13 which in turn is attached to the piston connecting rod 28, the connecting rod 28 and the piston 33 to which the connecting rod 28 is connected are positively accelerated to the right also. The positive acceleration of the mass 14 and 15 and the operating parts 13, 28 and 33 will continue until the fluid pressure in compartment 30 equals the force exerted by the spring 31. This equalization of forces will not be reached until the ports 38 are substantially closed. However, the ports 38 will remain open until the spring 31 has accelerated the mass 14 and 15 up to the velocity at which the bar-stock 16, the flag carriage 17, the pinion 23 the racks 22 and 24 and the valve control rod 25 are moving. When the equalization of velocities has been reached a balance will be brought about between the force of the spring 31 and the back force of the fluid in the chamber 30 and the port 38 will be substantially closed to prevent further acceleration. However the port 38 will remain open sufficiently to cause the velocity to substantially equal the velocity of the bar-stock 16. This balance is effected by the relative speeds of the moving bar-stock 16 and the now moving mass 14 and 15. If spring 31 pushes the mass 14 and 15 too fast the open port 38 in the moving piston sleeve 37 will overtake or "catch up" to the moving port regulating ring 40 and the port opening will be throttled down preventing the fluid from flowing out of chamber 30 as rapidly and thereby increasing the force of the pressure in chamber 30 to a point where it will balance the force of the spring 31 and slow the mass down. On the other hand if the velocity of the saw 14 and the motor 15 tends to fall below the velocity of the moving bar-stock 16 the valve control rod will move faster than the port 38 and open the port wider thereby increasing the fluid flow therethrough and further decreasing the fluid pressure which is restraining the spring 31. The greater reduction in the back force against spring 31 wll cause the spring 31 to accelerate the mass 14 and 15 and increase the velocity of the mass 14 and 15. In my device I have designed the initial acceleration period so that, for example, a three-quarter of an inch travel by the accelerated mass 14 and 15 will result in substantial equality of velocities between the mass 14 and 15 and the moving bar-stock 16. I have also designed my device so that a travel of approximately 6 inches, for example, by the saw and by the bar-stock while the saw 14 s cutting the bar-stock 16 will permit the severance of the bar 16. I also provide a period of negative acceleration. During this period the moving parts of my device may travel, for example, three-quarters of an inch and then the velocity of the moving part is reduced to zero in the following manner: When saw 14 cuts off the length of the bar-stock 16 the flag carriage 17 will no longer be pushed along by the movement of the bar-stock as the severed portion will drop away from contact with the flag 20 and the carriage will stop due to frictional resistance on the track 18. If rapid negative acceleration is desired the carriage can be brought to an abrupt stop by means of an adjustable bumper or by increased frictional resistance between the flag carriage 17 and the track 18. The frictional resistance could be governed by any of the known methods.

The slightest negative acceleration of the flag carriage 17 causes a rotational movement of the pinion 23 and a longitudinal thrust on the valve control rod 25. The thrust on the valve control rod causes a negative acceleration of the port regulating ring 40 and the port 38 which is still being urged by the spring 31 overtakes the ring 40 and the opening from chamber 30 into chamber 29 is closed. The slight forward movement which the mass 14 and 15 takes after the closing of the port 38 compresses the fluid in chamber 30 to the point when the force it exerts equals the force of the spring 31 and all moving parts including the mass 14 and 15 brought to a stop.

The piston sleeve 37 is slidably positioned adjacent the skirt of piston 33 to provide for absorbing shock during the initial positive acceleration period. In cases where the absorption of shock is unnecessary the piston sleeve 37 is not exactly essential to the operation of the device and a small port such as port 38 through the piston skirt 34 with the port regulating ring 40 positioned to open and close it would suffice. Ordinarily smooth shockless acceleration of the mass 14 and 15 is desirable. I have therefore provided the shock absorbing piston sleeve 37 and a gear and lever means indicated generally by the reference character 50 for causing relative motion between the piston 33 and the sleeve 37 when the spring 31 actuates the mass 14 and 15 and the piston 33.

The relative motion gear and lever means 50 is mounted in the left-hand end of the device and comprises a carrier plate 51 extending outwardly from the head of the piston 33 and adapted to carry the gears which actuate the piston sleeve 37 with respect to the piston 33. The carrier plate 51 is preferably integral with the head of the piston 33 but separate pieces may be used if suitable attaching means are provided to connect them together. A bell crank 52 is pivoted to the carrier plate 51. The end 53 of the bell crank 52 is slidably connected to the stationary actuating housing 10 by means of the end 53 being positioned in a curved slideway 54 in the underneath side of the stationary housing 10. A longitudinal movement of the piston 33 and the carrier plate 51 will cause the end 53 of the bell crank 52 to slide in the curved slideway 54 thereby turning the bell crank about its pivot point at 52. The other end of the bell crank 52 is pivotally connected to a connecting link 55 at point 56. An end 57 of the connecting link 55 is slidably connected in a cam slot 58 in the movable carrier plate 51. It will be seen therefore, that a movement of the piston 33 with respect to the stationary housing 10 will cause a rotational movement of the bell crank 52 and an enlarged rotational movement of the connecting link 55. An end 59 of the connecting link 55 is pivotally connected to one end of a second connecting link 60. The other end of the second connecting link 60 is attached to a crank gear 61 which is pivotally connected to the carrier plate 51 at point 62. The teeth of the crank gear 61 mesh with a rack 65 which is integral with the piston sleeve 37. The enlarged rotational movement of the connecting link 55 therefore causes a longitudinal movement of the piston sleeve 37. The longitudinal movement of the piston sleeve 37 is greater than the longitudinal movement of the piston 33. Due to the increased longitudinal movement of the piston sleeve 37 the port 38 does not drop far enough behind the port regulating ring 40 during a positive accelerating period to effect a too sudden opening of the port 38 and a jar during acceleration. In other words, when the port regulating ring 40 is moved longitudinally to the right by the bar-stock 16 and the port 38 is opened to permit fluid flow and thereby cause a movement of the piston 33, the piston sleeve 37 moves at a greater distance to the right toward the ring 40 than does the piston 33 and prevents a too sudden opening of the port 38. The movement of the port regulating ring 40 to the right is accompanied by movement of the piston 33 and the relative motion means 50 to the right. Because of the relatively long stroke or travel of my device, the slidable end 53 of the bell crank 52 leaves the curved slideway 54. A spring 49 is attached to the bell crank 52 and to the movable carrier plate 51 to bias the bell crank 52 in a position which causes the end or pin 53 of the bell crank 52 to re-enter the curved slideway 54 when the piston 33 and the carrier plate are returned to their original position with respect to the stationary housing 10. As the end or pin 53 re-enters the curved slideway 54 and continues to slide back, a port regulation is obtained to prevent jar during the negative acceleration period.

Figure 1:
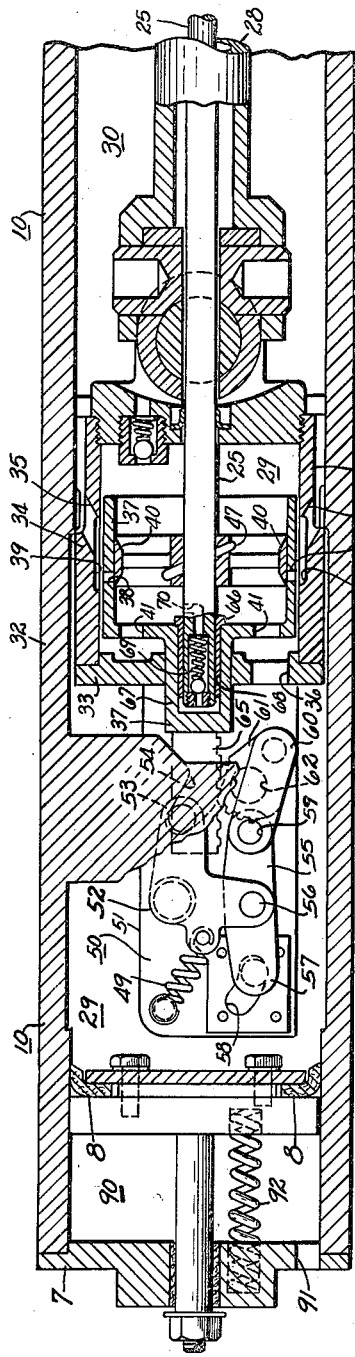
Figure 1 is a sectional view of part of my invention with portions broken away and showing the actuating cylinder.

I provide my acceleration device with another means for reducing shock due to rapid acceleration. It is a suction means and is indicated generally by the reference character 66. The suction means 66 is comprised of a cylinder 67 integral with the head of the piston sleeve 37. A suction piston 68 is provided on the end of the valve control rod 25 and is adapted to fit inside the cylinder 67 and to be actuated with respect to the cylinder 67 by the movements of the valve control rod 25. A longitudinal movement of the valve control rod 25 to open the port 38 will cause a longitudinal movement of the suction piston 68 with respect to the suction cylinder 67 in the head of the piston sleeve 37. The relative movement of the suction piston 68 with respect to the suction cylinder 67 creates a partial vacuum in the suction cylinder 67 and pulls the entire piston sleeve 37 to the right in Figure 1 with respect to the valve control rod 25. The movement of the piston sleeve 37 to the right with respect to the valve control rod 25 prevents a sudden opening of the port 38 and the accompanying shock due to too rapid acceleration of the mass 14 and 15.

The port 38 is partially opened by the movement of the valve control rod 25 before the partial vacuum in the suction cylinder 67 is sufficient to draw the piston sleeve 37 toward the valve control rod 25. The partial opening of the port 38 allows a fluid flow from chamber 30 into chamber 29 and causes an acceleration of the piston 33, the piston sleeve 37, the valve control rod 25 and the mass 14 and 15. The suction piston 68 is provided with a ball-check valve 69 and a passageway 70 from inside the suction cylinder 67 to the chamber 29. The ball-check valve 69 is adapted to permit removal of any fluid which enters the suction cylinder 67 due to the partial vacuum which is created therein by a positive acceleration of the device. Should oil or fluid enter the suction cylinder 67, it is vented by the return of the port regulating ring 40 and the valve control rod 25 to a position which closes the port 38. The return of the valve control rod 25 to the closing position thrusts the suction piston 68 into the suction cylinder 67 and creates a fluid pressure therein which opens the ball-check valve 69 and allows the fluid to pass through the passageway 70 into the chamber 29.

Although I have illustrated my device as having two means of reducing initial accelerating shock it is to be understood that my device may be operative without either in those cases where the shock is not damaging. It is also to be understood that the gear and lever means 50 for modifying movement between the piston 33 and the piston sleeve 37 may be used without the suction means 66 and that the suction means 66 may be used without the gear and lever means 50.

The suction means 66 when used in cooperation with the gear and lever means 50 is a booster to accelerate the movement of the gear and lever means. Although the gear and lever means is designed to never get on "dead center" it may approach it enough to be sluggish. The use of the suction means 66 will reduce the amount of sluggishness.

My device is designed to operate automatically and a complete cycle of operation may be as follows: The moving bar-stock 16 which is driven through rollers 46 by the motor 45 engages the flag 20 of the movable flag carriage 17 thereby rotating the flag 20 about a pivot point 76 and causing an actuating arm 77 to engage a projection 78 on a turnable shaft 79, and turn the shaft. The turning of shaft 79 actuates a drill rod rotating arm 80. The actuation of the drill rod rotating arm 80 rotates the drill rod 21, which is connected to the rack 22 by a swivel joint 84, and operates a cam 81. The operation of cam 81 controls a gear box 82 which is driven through the power line 85 by motor 45, to apply power through line 86 to drive the saw 14 forward on a pair of tracks 75. The saw 14 moves forward toward the bar-stock 16 and is positioned with respect to the bar-stock 16 so that operation of the saw 14 by motor 15 cuts through the bar-stock. During the short interval of time necessary to position the saw 14 to cut the bar-stock 16 the positive acceleration of the saw 14 and the motor 15 to a velocity governed by the velocity of the moving bar-stock 16 has taken place. The terminal velocity of the saw 14 and its carrying mechanism is governed by the moving bar-stock 16 pushing the flag carriage 17 along the track 18 and is the same velocity that the bar-stock 16 is moving. The detailed operation of the acceleration mechanism and the means for paralleling the velocity of the mass 14 and 15 with the velocity of the moving bar stock 16 has heretofore been described. After the saw 14 has cut through the bar-stock 16 which takes place during the period in which their velocities are substantially equal, the severed end of the bar-stock 16 drops away from contact with the flag 20. As there is no longer a force against the flag 20 it pivots back to its initial position and the carriage 17 stops. The return of the flag 20 to its initial position actuates cam 81 thereby influencing the gear box 82 to withdraw the saw 14 from the bar-stock. During the final withdrawal of the saw 14 a bell crank 87 is actuated which in turn operates the gear box 82 and its operation causes power from the motor 45, which is still actuating the bar-stock 16, to be applied to the mass attaching plate 13 through line 88 to restore the accelerating device to its initial position; that is to compress the spring 31 and prepare the device for another operative cycle. During the period in which the saw 14 is withdrawn from the bar-stock 16 the saw 14 and the motor 15 are passing through their period of negative acceleration and brought to zero velocity. The equipment is designed so that the moving parts reach zero velocity before actuating the bell crank 87 and before the moving bar-stock 16 engages the flag 20 to start another operative cycle. It is to be understood that my acceleration mechanism may be returned to its starting position by any means. That is, a hand crank or motor independent of the bar-stock drive could be used to reset spring 31 for another acceleration of mass 14 and 15.

As the operation of my device depends upon the balance of pressure between compartment 29 and the spring 31 on one hand and the compartment 30 on the other hand, it will be seen that the movement of the piston connecting rod 28 with respect to the stationary cylinder 32 will change the volume and therefore change the pressure balance within the cylinder 32 and thereby affect the operation of my device. To compensate for the fluid displaced by the piston connecting rod 28 I have designed the fluid seal 8 to float within the cylinder 32 and establish a third compartment 90 within the cylinder. Compartment 90 contains no fluid and is vented to atmosphere through opening 91 in the closing plate 7. A spring 92 is positioned between the closing plate 7 and the fluid seal 8 to bias the fluid seal 8 toward the compartment 29. When my device is in an operative position but does not have the force of the accelerating spring 31 on it the following conditions exist: Compartments 29 and 30 are substantially entirely filled with a fluid such as oil and there is no difference in fluid pressure between the compartments. The piston 33 which establishes a liquid seal between the compartments 29 and 30 is floating. That is, it is not biased in any direction. When the force of spring 31 is put onto plate 13 it is transferred to the piston 33 and biases the piston against the fluid in compartment 30. The biasing of the piston 33 causes the fluid in compartment 30 to exert a pressure against the piston 33. The biasing of the piston 33 also tends to cause a negative fluid pressure in compartment 29 were it not for the liquid seal 8 being movable. The liquid seal 8 moves to the right under the urging of the spring 92 and the negative fluid pressure in compartment 29 until the fluid pressure in compartment 29 is substantially atmospheric.

When my device operates to accelerate the mass 14 and 15 the piston connecting rod 28 moves to the right a short distance and the fluid spaces in compartments 29 and 30 are effectively increased by part of rod 28 passing out of the cylinder by way of the fluid seal 9. This effective enlargement in the compartments 29 and 30 causes the pressure in compartments 29 and 30 to decrease. The reduction in pressure in compartments 29 and 30 causes spring 92 to push the floating fluid seal 8 to the right and build up the pressure. In effect, therefore, the floating fluid seal 8 compensates both of the compartments 29 and 30 for any change in volume resulting in a change in fluid pressure occasioned by the withdrawal of the piston connecting rod 28 from the cylinder 32. As both compartments 29 and 30 are compensated for the change in pressure, there is no change in one compartment with respect to the other due to the movement of the piston connecting rod 28. As before explained, the acceleration of the mass 14 and 15 is caused by differences in fluid pressure between compartments 29 and 30 as regulated by fluid flow through the port 38. It is therefore to be seen that the acceleration of the mass 14 and 15 is not affected by the withdrawal of the piston connecting rod 28 from the cylinder 32 as the apparent difference in fluid pressure which is created by the withdrawal is compensated for by a movement of the piston 33 and by a movement of the floating fluid seal 8 which reestablishes and maintains a fluid pressure balance between the two compartments 29 and 30 except for fluid actually passing from one compartment to the other.

Summarizing, my device 10 is adapted to accelerate a mass 14 and 15 from zero velocity and limit its speed to the velocity of a moving mass such as the bar-stock 16 and to cause the velocity of the accelerated mass 14 and 15 to parallel the velocity of the moving mass 16 throughout a fixed distance, that is, the distance required for saw 14 to cut through bar-stock 16. During this fixed distance or period of perfect paralleling there is only minute relative motion between piston 33, piston sleeve 37 and the port regulating ring 40 as they are all moving substantially at the same speed which is regulated by the velocity of the moving mass 16. Further, my device is adapted to decelerate the moving mass 14 and 15 to change their velocity from that regulated by the bar-stock 16 to zero and automatically prepare itself for another cycle.

While I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention

1. A device for accelerating a first mass to a speed governed by the speed of a second mass comprising, in combination, energy means adapted to exert a force to accelerate said first mass, hydraulic means for exerting a force to oppose the acceleration of said first mass, means actuated by said second mass for reducing the opposing force exerted by said hydraulic means thereby causing said energy means to accelerate said first mass, and valve means regulated by the relative speeds of said first and second masses for establishing a relationship between the accelerating force exerted by the energy means and the opposing force exerted by the hydraulic means to cause said first mass to maintain substantially the same speed as said second mass, said valve means comprising fluid orifice resisting means including a first orifice means movable with the first mass and a second orifice means movable with the second mass.

2. A device for accelerating a first mass to a speed governed by the speed of a second mass comprising, in combination, energy means adapted to exert a force against said first mass, a fluid reservoir for resisting the force exerted by said energy means, and valve means actuated by the relative speeds of said first and second masses for reducing the pressure in the said reservoir thereby causing the said energy means to accelerate said first mass to the speed of the second mass, said valve means comprising fluid orifice resisting means including a first orifice means movable with the first mass and a second orifice means movable with the second mass.

3. A device for accelerating a first mass to a speed governed by the speed of a second mass comprising, in combination, a fluid housing, piston means attached to said first mass and dividing said fluid housing into two chambers, force exerting means adapted to exert a force against said first mass, said force being opposed by high fluid pressure in one of said chambers, port opening means through said piston means for passing fluid from one chamber to the other and port opening and closing means actuated by said second mass for regulating said port opening to change the fluid pressure in the high pressure chamber thereby causing the first mass to accelerate.

4. A device for equalizing the speeds of two masses comprising, in combination, a housing, movable piston means attached to one of said masses and positioned in said housing thereby dividing said housing into two chambers, force exerting energy means urging said piston in one direction, fluid means in one of said chambers for resisting said urging force, port means through said piston for passing said fluid from one chamber to the other, and port covering means actuated by the other of said masses, said piston and port and said port covering means moving in said housing at speeds dependent upon the speeds of the masses by which they are actuated and the relative speeds of the piston and port and the port covering means regulating the opening and colsing of the said port to effect the fluid resistance to the force exerted by the energy means and bring the two masses to substantially equal speeds.

5. A device for equalizing motion between two masses comprising, in combination a fluid housing, piston means connected to the first of said masses and dividing said fluid housing into two compartments, energy means adapted to exert an accelerating force against said piston means, fluid means in one of said compartments for exerting a resisting pressure against accelerating force, valve means in said housing for reducing said fluid pressure to cause the said energy means to accelerate the said piston means and the said first mass, said valve means being opened and closed in a fixed relation to the relative speeds of the said two masses.

6. A device for limiting and regulating the speed of an accelerating mass to the speed of a second mass comprising, in combination, a fluid housing, a piston connected to said accelerating mass and dividing said fluid housing into two compartments, accelerating force means urging said piston and said mass to accelerate, fluid means in one of said compartments compressed by and resisting said accelerating force, port means through said piston for relieving said fluid pressure to cause said accelerating force to exceed said resisting force thereby accelerating said piston and said accelerating mass and port opening and closing means actuated by and movable with said second mass for relieving said fluid pressure in accordance with the difference in speed between said second mass and said accelerating mass thereby causing said accelerating mass to attain a speed substantially equal to the speed of said second mass.

7. A device for regulating the acceleration and the speed of a first mass by the speed of a second mass comprising, in combination, a fluid housing, a movable piston attached to said first mass and dividing said fluid housing into two compartments and establishing a fluid seal therebetween, accelerating force means urging said movable piston and said first mass to accelerate, and said first mass to accelerate, fluid means in one of said compartments resisting said accelerating force means, sleeve means adjacent said piston and movable relative thereto, port means in said piston and in said sleeve for relieving said fluid pressure to cause said accelerating force to exceed said resisting force thereby accelerating said piston and said first mass, port regulating means actuated by and movable with said second mass for opening said port and relieving said fluid pressure in accordance with the difference in speed between said second mass and said first mass and lever means connecting said sleeve to said piston whereby movement of the piston under the influence of the accelerating force will produce a proportional movement in said sleeve, the movement of the port means in said sleeve and the movement of the port regulating means adjusting the fluid flow through the port means to regulate the acceleration and speed of the first mass by the speed of the second mass.

8. A speed equalizing device comprising, in combination, a fluid housing, a movable piston dividing said housing into two compartments and establishing a fluid seal therebetween, energy means in one of said compartments, energy means for biasing said movable piston against said fluid thereby establishing a fluid force against said movable piston which is opposite and substantially equal to the force exerted by the energy means, port means through said movable piston for relieving said fluid pressure to cause the force of said energy means to exceed the force of the said fluid means thereby moving said movable piston, and movable port opening and closing means adapted to open said port in accordance with the speed it is moving thereby tending to reduce said fluid pressure in accordance with the speed of the port opening and closing means and causing said movable piston to move at a speed substantially equal to that of the port opening and closing means to maintain a relationship of opposing forces between the said energy means and the said fluid means.

9. A speed equalizing device comprising, in combination, a housing, movable piston means in said housing establishing two housing compartments with a liquid seal therebetween, a liquid in one of said compartments, means for urging said movable piston against said liquid to establish a liquid pressure against said piston which opposes the force of said urge, a port in said movable piston connecting said two compartments and port closing means adapted to open said port in accordance with a certain speed which said movable piston is to equal, the opening of said port causing a reduction in liquid pressure and a movement of said piston and said port, the rate of movement of said piston and said port being such as to close said port to re-establish a relationship between the force of the urging means and the force of the liquid pressure.

10. A device for regulating the acceleration and the speed of a first mass by the speed of a second mass, comprising, in combination, a fluid housing, a movable piston attached to said first mass and dividing said fluid housing into two compartments and establishing a fluid seal therebetween, acceleration force means urging said movable piston and said first mass to accelerate, fluid means in one of said compartments resisting said accelerating force means, sleeve means adjacent said piston and movable relative thereto, port means in said piston and in said sleeve for relieving said fluid pressure to cause said accelerating force to exceed said resisting force thereby accelerating said piston and said first mass, port regulating means actuated by and movable with said second mass for opening said port and relieving said fluid pressure in accordance with the difference in speed between said second mass and said first mass and vacuum means operable by said port regulating means for urging said sleeve means and said port means therein to move, the movement of the port means in said sleeve and the movement of the port regulating means adjusting the fluid flow through the port means to regulate the acceleration and speed of the first mass by the speed of the second mass.

11. A cut-off machine for paralleling movement of a saw with moving bar stock comprising, in combination, an actuating cylinder, a movable piston attached to said saw and dividing said actuating cylinder into two compartments, hydraulic means in one of said compartments, energy means urging said saw to accelerate and urging said movable piston against said hydraulic means to establish a pressure in said hydraulic means which is opposite to the pressure exerted by the energy means, movable port means through said movable piston for reducing said hydraulic pressure to cause said energy means to accelerate said piston and said saw, port opening and closing means for regulating the port opening through the said piston to regulate the flow of fluid from said cylinder compartment, said port opening and closing means being operatively connected to said moving bar stock and adapted to open and close said movable port in accordance with the difference in speed between the bar stock and the saw, said piston moving faster than said port opening and closing means and closing said movable port when said saw is moving faster than said bar stock and said port opening and closing means moving faster than said piston and opening said movable port when said bar stock is moving faster than said saw.

12. A device for causing stationary saw means to accelerate to and parallel the speed of moving bar stock comprising, in combination, a cylinder having its axis parallel to the lines of travel of said bar stock and said saw means, a piston in said cylinder attached to said saw means and dividing said cylinder into two compartments, hydraulic means in said cylinder, said piston having skirt means extending in the direction of the axis of said cylinder, said skirt means having port means therethrough for the passage of said hydraulic means from one compartment to the other, energy means for exerting a force against said stationary saw means and against said piston, said force compressing the hydraulic means in one of said compartments, port opening and closing means actuated by said moving bar stock and movable parallel to the axis of the said cylinder, said port opening and closing means being adapted to open said port when the bar stock is moving faster than said saw means to cause the energy means to accelerate the saw means and the said piston, until the saw means is traveling at the same rate of speed as the said bar stock, and said port being closed by the piston overtaking said port opening and closing means when said saw means is traveling at a rate of speed greater than said bar stock, the speed of the bar stock and the port opening and closing means and the speed of the saw means and the piston regulating the port opening to maintain a relationship between the force of the energy means and the hydraulic force to cause said saw means to parallel the speed of the bar stock while said saw means cuts through said bar stock.

13. A device for accelerating a first mass to a speed governed by the speed of a second mass comprising, in combination, energy means adapted to exert a force against said first mass, a fluid reservoir with fluid therein for resisting the force exerted by said energy means, port means communicating with said fluid reservoir and actuated by the speed of one mass and port closing means movable relative to the port means and actuated by the speed of the other mass for regulating the opening of the port means in proportion to the relative speeds of said first and second masses thereby reducing the pressure of the fluid in said reservoir to cause the energy means to accelerate said first mass to substantially equal the speed of said second mass.

14. A device for accelerating a first mass to a speed governed by the speed of a second mass comprising, in combination, energy means adapted to exert a force against said first mass, a fluid reservoir with fluid therein for resisting the force exerted by said energy means, port means communicating with said fluid reservoir and actuated by the speed of one mass, port closing means actuated by the speed of the other mass for regulating the opening of the port means in proportion to the relative speeds of said first and second masses thereby regulating the flow of the fluid in said reservoir to cause the energy means to accelerate said first mass to substantially equal the speed of said second mass, and means for modifying the movement of the port means with respect to the movement of the mass which actuates said port means to provide a time delay in the acceleration of said first mass.

15. A device for accelerating a first mass to a speed governed by the speed of a second mass comprising, in combination, energy means adapted to exert a force against said first mass, a fluid reservoir with fluid therein for resisting the force exerted by said energy means, port means communicating with said fluid reservoir and actuated by the speed of one mass, port closing means actuated by the speed of the other mass for regulating the opening of the port means in proportion to the relative speeds of said first and second masses thereby regulating the pressure of the fluid in said reservoir to cause the energy means to accelerate said first mass to substantially equal the speed of said second mass, and vacuum means for modifying the movement of the port means with respect to the movement of the mass which actuates said port means to provide a time delay in the acceleration of said first mass.

16. A fluid device for accelerating a mass comprising, in combination, energy means adapted to exert an accelerating force against said mass, a housing having fluid, piston means displacing fluid in said housing and adapted to receive the accelerating force of said energy means and govern the acceleration of said mass, the amount of said fluid displaced by said piston means varying as said piston means transmits accelerating force to said mass and means for compensating for the variation in the amount of fluid displaced by the said piston means.

17. A device for moving a first mass in accordance with the movement of a second mass comprising, in combination, means for moving the first mass, fluid regulating means for governing the moving means, and means responsive to the relative movements of the first and second masses for actuating the fluid regulating means, said regulating means comprising fluid orifice resisting means including a first orifice means movable with the first mass and a second orifice means movable with the second mass.

18. A device for moving a first mass in accordance with the movement of a second mass comprising, in combination, means for moving the first mass, fluid regulating means for governing the moving means, said fluid regulating means comprising fluid orifice resisting means having two orifice parts movable relative to each other, means responsive to the movements of the first mass for moving one of said parts, and means responsive to the movements of the second mass for moving said other part.

19. A device for moving a first mass in accordance with the movement of a second mass comprising, in combination, means for moving the first mass, fluid means opposing the movement of the moving means, fluid regulating means for governing the fluid means, and means responsive to the relative movements of the first and second masses for actuating the fluid regulating means, said regulating means comprising fluid orifice resisting means including a first orifice means movable with the first mass and a second orifice means movable with the second mass.

20. A device for moving a first mass in accordance with the movement of a second mass comprising, in combination, spring means for moving the first mass, fluid means opposing the movement of the spring means, fluid regulating means for governing the opposing means, and means responsive to the relative movements of the first and second masses for actuating the fluid regulating means, said regulating means comprising fluid orifice resisting means including a first orifice means movable with the first mass and a second orifice means movable with the second mass.

21. A device for moving a first mass in accordance with the movement of a second mass comprising, in combination, spring means for moving the first mass, fluid means opposing the movement of the spring means, and fluid regulating means for governing the opposing means, and means responsive to the relative movements of the first and second masses for actuating the regulating means, said regulating means comprising fluid orifice resisting means including a first orifice means movable with the first mass and a second orifice means movable with the second mass, said first and second orifice means being movable relative to each other.

22. A device for moving a first mass in accordance with the movement of a second mass comprising, in combination, a fluid housing having a piston therein dividing the housing into two compartments, means for connecting the first mass to the piston, means for moving the first mass and thus actuating the piston within the housing, fluid regulating means for governing the flow of fluid from one compartment to the other, upon the movement of the piston, said regulating means comprising a first means movable with the first mass and a second means movable with the second mass.

ELSMERE W. McKINNEY.